United States Patent [19]

Heinmets et al.

[11] 4,156,365

[45] May 29, 1979

[54] TEMPERATURE INDICATOR

[76] Inventors: Ferdinand Heinmets; Julian T. Heinmets, both of 55-508 Dinsmore Ave., Framingham, Mass. 01701

[21] Appl. No.: 905,730

[22] Filed: May 15, 1978

Related U.S. Application Data

[63] Continuation-in-part of Ser. No. 710,895, Aug. 2, 1976.

[51] Int. Cl.² ............................................. G01K 11/12
[52] U.S. Cl. ..................................... 73/343 B; 73/356
[58] Field of Search .................. 73/343 R, 343 B, 356, 73/358; 116/114 V

[56] References Cited

U.S. PATENT DOCUMENTS

| | | | |
|---|---|---|---|
| 2,190,383 | 2/1940 | Newman | 73/343 B |
| 3,135,118 | 6/1974 | Zlobin | 73/343 B |
| 3,523,011 | 8/1970 | Bhiwanoker et al. | 73/356 |
| 3,561,269 | 2/1971 | Seitz | 73/356 |
| 3,651,695 | 3/1972 | Brown | 73/356 |
| 3,695,110 | 10/1972 | Biolik | 73/343 R |
| 3,696,675 | 10/1972 | Gilmour | 73/356 |
| 3,782,195 | 1/1974 | Meek et al. | 73/343 B |
| 3,936,626 | 2/1976 | Moore | 219/10.55 E X |
| 3,975,288 | 8/1976 | Davis | 73/356 |
| 4,019,368 | 4/1977 | Navato | 73/356 |

*Primary Examiner*—S. Clement Swisher
*Attorney, Agent, or Firm*—Charles Hieken

[57] ABSTRACT

Food temperature vessel or other utensil comprising a thermochromic layer at a surface thereof indicating temperature of the food content of the vessel within a safe range above 60° and below 70° C. corresponding to achievement of safety conditions by raising the food content above the minimum temperature of the range to produce reversible protein denaturation in certain microorganisms to limit sporulation, and below a limit corresponding to irreversible protein denaturation and tissue injury of the tongue, lips or throat tissues of the user on the upper end of the range. The thermochromic layer goes through a transition from red to black across the range.

4 Claims, 5 Drawing Figures

TEMPERATURE INDICATOR

CROSS REFERENCE TO RELATED APPLICATION

This application is a continuation-in-part of copending Application Ser. No. 710,895 filed Aug. 2, 1976.

BACKGROUND OF THE INVENTION

The present invention relates to food holding vessels and other utensils and is characterized in the provision of a simple and economical food temperature indicating means showing limiting safety conditions to be observed before dispensing or consuming the food contained or held on such utensil.

It is an important object of the invention to signal over- or under-heating of food by a dramatic color change at predetermined upper and lower critical temperature limits to inform a server or consumer of food when the food (including beverages as well as solid foods) is best suited for consumption.

It is a further object of the invention to provide a reliable, repeatably operating signal, consistent with the preceding object.

It is a further object of the invention to provide highly visualizable, unmistakable signal consistent with one or both of the preceding objects.

It is a further object of the invention to signal distribution of temperatures as well as indicate temperature at any given location consistent with one or more of the preceding objects.

It is a further object of the invention to provide a practical microwave oven temperature sensor consistent with one or more of the preceding objects.

SUMMARY OF THE INVENTION

In accordance with the invention, single dots, arrays of dots, lines or other patterns of thermochromic paint applied to the exterior of a food serving vessel or just below a transparent exterior layer within the wall of a food serving vessel to indicate temperature. The thermochromic paint may be embodied in other coating layer forms such as tapes of frits to be mixed in with the material of a vessel wall production. The food serving vessels benefited through the invention include serving trays, dishes, cups, glasses, mugs, spoons, ladles, pots and pans of metal, glass, pottery, plastic or paper. The thermochromic marker may be integrated with background reference designs to blend therein at or above a preselected temperature level and be distinct therefrom below such level, or alternatively, the reverse.

Generally the range of temperatures selected for activation of the thermochromic paint is between 60° and 70° C., the paint having a gradual color transition over a range of at least 5° C. reflecting the following considerations.

It has been suggested in the medical literature that certain types of cancerproducing conditions may be aggrevated by burning of tissue in the tongue, lips or throat or elsewhere in the alimentary tract where proteins of mucous membrane become denatured. If the maximum termperature that such proteins are exposed to are in the 60°–65° C. range, then the denaturation is predominantly reversible. However, at higher temperatures above 70° C., the denaturation is essentially irreversible. Chronic exposures of such higher temperatures may lead to tissue pathology and sometimes malignancy. A lower end of the selected range of color change reflects the consideration, particularly applicable in connection with serving vessels, that microorganisms grow poorly at temperatures above 50° C. with the exception of some spore forming bacteria which do grow and form toxins above 50° C., including among other *Clostridium perfringens*. If food temperature is raised to 60° C. or greater where protein denaturation takes place, sporulation stops and the toxins are not produced.

It has also been discovered that thin walled plastic cups and the like coated with thermochromic layering in accordance with the invention provides a practical microwave oven temperature sensor meeting a long felt need in such field.

A plastic cup and the like will not significantly couple to the microwave energy source of a microwave oven to the extent that either the food or a metal vessel (with or without porcelain coating thereon) would. Therefore, a thin wall plastic cup and the like coated with thermochromic layering in accordance with the present invention can be used in a microwave oven to produce the above described thermochromic effects in the thermochromic layer in response substantially solely to change of food temperature. The long felt need in the microwave oven field for a practical sensor is thus fulfilled.

Other objects, features and advantages of the invention will be apparent from the following detailed description of preferred embodiments taken in connection with the accompanying drawing, in which:

DETAILED DESCRIPTION OF PREFERRED EMBODIMENTS

Figure 1:
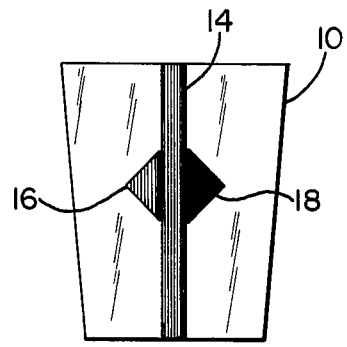
FIGs. 1 and 2 are side views of a cup coated in accordance with a preferred embodiment of the invention to show color changes at low and high temperatures, respectively.
Figure 2:
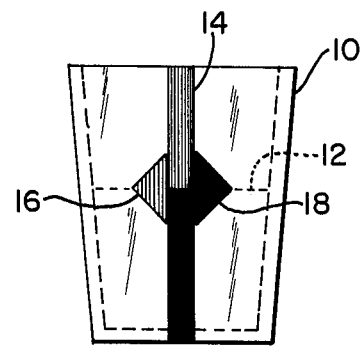
Figure 3:
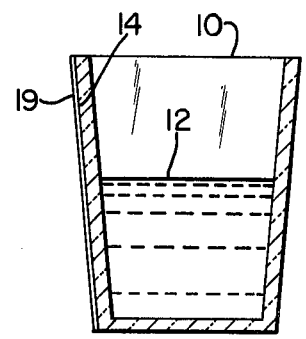
FIG. 3 is a cross section view of the FIGS. 1-2 cup.

FIG. 1 shows a cup 10 with a liquid level 12 therein, marked on the side with a stripe 14 between minimum and maximum range defining markers 16 and 18, respectively. The marker 16 is red and the marker 18 is black and the stripe 14 is selected so that at a low temperature its color is essentially the same as the color of marker 16 and at high temperatures exceeding the upper limit of a physiologically safe range, as indicated in the lower portion of the cup in FIG. 2, it changes to about the same color as the reference marker 18. FIG. 3 is a cross section view of the cup showing that the stripe 14 is overlaid with a transparent coating 19. This strip 14 may be supplemented by an additional stripe (not shown) which is clear at room temperature but changes to the color of reference marker 16 to indicate reaching or exceeding the lower end of a physiologically safe range.

Preferably the thermochromic paint has a characteristic original bright red color at 55°–65° C., but which changes to maroon and almost black as it approaches 70° C. and above such temperature goes to deep black and reverses such color changes as the temperatures are lowered. For instance, such reaponse is obtainable from the line of Chromonitor brand paints of Big Three Industries Inc., Tempril Division, South Plainfield, New Jersey, U.S.A., and Thermocolor brand paints of Faber-Costell Co., West Germany. The coating may be in liquid form and brushed on or sprayed or preformed as a tape or wax or other solid to be adhered to the cup. A clear synthetic polymer coat can be applied over the paint. This or other means for imbedding the thermochromic marker within the utensil wall protect the marker from abrasion or other physical damage. U.S. Pat. No. 3,561,269 granted Feb. 9, 1971, also provides access to thermochromic paint, modifiable to higher temperature transition range in accordance with the teaching of the present application to monitor food temperatures.

The thermochromic layering may be as single dots, arrays of dots, lines or other patterns showing distribution of temperature around a vessel and may be correlated with decorative patterns or alphanumeric characters showing safe and/or unsafe condition of the food contained in the vessel.

Figure 4:
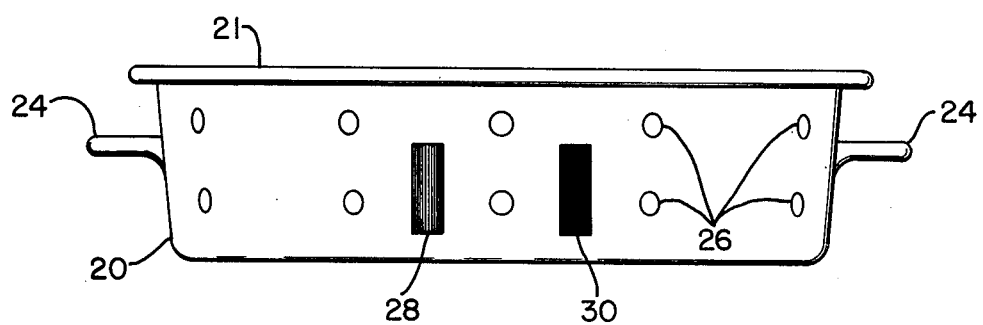
FIG. 4 is a side view of a serving dish marked in accordance with a preferred embodiment of the invention.

FIG. 4 shows a metal or pottery serving vessel 20 with an upper turned flange 22, handles 24 and an array of thermochromic marking dots 26 thereon and also including low and high temperature reference markers 28 and 30. The various coloring dots 26 will be closer in color to reference markers 28 and 30 depending on temperature distribution of food in vessel 20. This overall coverage of temperature monitoring warns the user to adjust food heating or cooling conditions until all the food appears to be in the desired temperature range. The reversibility of the color change allows reuse of the vessel after emptying out its contents and cooling it.

Consistent with the various embodiments of the invention described above, a utensil wall can be formed with a shallow recess to receive the thermochromic marker(s).

Figure 5:
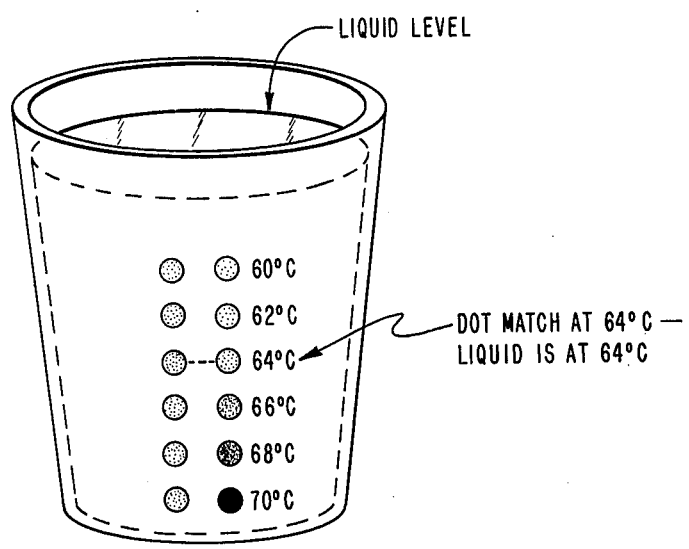
FIG. 5 is a perspective view of a cup according to another embodiment of the invention for indicating temperature by comparing the color of a column of dots having temperature sensitive color with dots of fixed color representative of the different temperatures.

Referring to FIG. 5, there is shown another aspect of the invention resides in having a series of dots of thermochromic material in juxtaposition with a series of dots of different reference colors that do not change to indicate the temperature of the food when the color of the thermochromic dot matches the color of the reference dot. For example, the reference dots may represent colors at two degree intervals, corresponding to thermochromic color at these particular temperatures also printed beside the respective thermochromic dots.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

What is claimed is:

1. Safe food temperature sensing utensil comprising, means defining a nonmetallic, food holding vessel, means defining a thermochromic paint layer on the vessel positioned to be visible to a user and constructed and selected to change color twice in a selected temperature range comprising 60°-70° C. to provide indications of the levels of temperature at which denaturation of the food, microbial, growth in the food and tissue injury to the consumer of food carried by the untensil would be likely and to reverse said color changes when re-cooled.

2. Safe food temperature sensing utensil in accordance with claim 1 wherein the thermochromic paint layer is a thin coating on an outer surface of the utensil.

3. Safe food temperature sensing utensil in accordance with claim 1 wherein the thermochromic paint layer has a definite design form which is set against a different background design form and is distinctly visible thereagainst when below a preselected temperature level and blends therein at or above said level.

4. Safe food temperature sensing utensil in accordance with claim 1 wherein said means defining a thermochromic layer comprises a series of dots of thermochromic material and further comprising,
a corresponding series of dots of different reference colors in juxtaposition with said series of dots of thermochromic material to enable a user to identify the temperature of the utensil by noting correspondence in color between a dot of thermochromic material and a dot of reference color,
and indicia indiating the temperature represented by each reference color beside a respective reference dot.

* * * * *